United States Patent
Zavesky

(10) Patent No.: US 10,936,966 B2
(45) Date of Patent: Mar. 2, 2021

(54) AGENT FOR LEARNING AND OPTIMIZATION EXECUTION

(71) Applicant: AT&T Intellectual Property I, L.P., Atlanta, GA (US)

(72) Inventor: Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1065 days.

(21) Appl. No.: 15/050,787

(22) Filed: Feb. 23, 2016

(65) Prior Publication Data
US 2017/0243133 A1 Aug. 24, 2017

(51) Int. Cl.
G06N 20/00 (2019.01)

(52) U.S. Cl.
CPC .................. G06N 20/00 (2019.01)

(58) Field of Classification Search
CPC ....................................... G06N 20/00
See application file for complete search history.

(56) References Cited

U.S. PATENT DOCUMENTS

| 8,855,014 | B2 | 10/2014 | Previdi et al. |
| 8,978,102 | B2 | 3/2015 | Hughes et al. |
| 9,027,024 | B2 | 5/2015 | Mick et al. |
| 9,124,485 | B2 | 9/2015 | Heron et al. |
| 2003/0191837 | A1* | 10/2003 | Chen .................... H04L 41/142 709/224 |
| 2009/0055507 | A1* | 2/2009 | Oeda ..................... G06F 9/4856 709/216 |
| 2013/0325776 | A1* | 12/2013 | Ponulak ................... G06N 3/08 706/25 |
| 2014/0082003 | A1* | 3/2014 | Feldman ............. G06F 17/2705 707/755 |
| 2014/0279754 | A1* | 9/2014 | Barsoum ................ G06N 7/005 706/12 |
| 2014/0280802 | A1 | 9/2014 | McDowall |
| 2014/0280900 | A1 | 9/2014 | McDowall |

(Continued)

FOREIGN PATENT DOCUMENTS

| AU | 2014101209 A4 | 11/2014 |
| CA | 2897664 A1 | 7/2014 |

(Continued)

OTHER PUBLICATIONS

Archer, David W., and Adam Wick. "Peer-to-Peer Enclaves for Improving Network Defence." Technology Innovation Management Review 3.7(2013). http://timreview.ca/article/701.

(Continued)

*Primary Examiner* — Ann J Lo
*Assistant Examiner* — Tsu-Chang Lee
(74) *Attorney, Agent, or Firm* — BakerHostetler

(57) ABSTRACT

An autonomous agent maintains and updates an underlying model in a dynamic system. The autonomous agent receives minimum acceptable criteria from secondary users of the underlying model. The agent then compares current output samples of the model with the minimum acceptable criteria. If output samples do not meet the minimum acceptable criteria, then the agent formulates alternative model improvement actions and evaluates each alternative action by modeling rewards associated with it. The agent executes the alternative model improvement action having the highest reward.

14 Claims, 5 Drawing Sheets

(56) References Cited

U.S. PATENT DOCUMENTS

| | | | |
|---|---|---|---|
| 2014/0301192 A1 | 10/2014 | Lee et al. | |
| 2014/0324911 A1* | 10/2014 | de Lavarene | G06F 9/5011 |
| | | | 707/781 |
| 2014/0331280 A1 | 11/2014 | Porras et al. | |
| 2014/0379885 A1 | 12/2014 | Krishnamurthy et al. | |
| 2015/0003448 A1 | 1/2015 | Swinkels et al. | |
| 2015/0131989 A1 | 5/2015 | Syed et al. | |
| 2015/0131997 A1 | 5/2015 | Syed et al. | |
| 2015/0142962 A1 | 5/2015 | Srinivas et al. | |
| 2015/0195149 A1 | 7/2015 | Vasseur et al. | |
| 2015/0244580 A1* | 8/2015 | Saavedra | H04L 41/0816 |
| | | | 709/221 |
| 2015/0324690 A1* | 11/2015 | Chilimbi | G06N 3/08 |
| | | | 706/25 |
| 2015/0347923 A1* | 12/2015 | Bartley | G06F 11/079 |
| | | | 706/12 |

FOREIGN PATENT DOCUMENTS

| | | |
|---|---|---|
| EP | 2859755 A1 | 4/2015 |
| EP | 2901636 A1 | 8/2015 |
| WO | 2014153421 A2 | 9/2014 |
| WO | 2014160479 A1 | 10/2014 |
| WO | 2015026785 A2 | 2/2015 |
| WO | 2015032435 A1 | 3/2015 |
| WO | 2015126507 A1 | 8/2015 |

OTHER PUBLICATIONS

Gopalasingham, Aravinthan, et al. "Generalized Software Defined Network Platform for Radio Access Networks." IEEE Consumer Communications and Networking Conference (CCNC). 2016. https://hal.inria.fr/hal-01216869/document.

Malboubi, Mehdi, et al. "Software Defined Network Inference with Passive/Active Evolutionary-Optimal pRobing (SNIPER)." Computer Communication and Networks (ICCCN), 2015 24th International Conference on IEEE, 2015, http:rubinet.ece.ucdavis.edu/paper/2015/icccn15_SNIPER.pdf.

Tran, Nam Manh, et al. "Constructing Energy-Aware Software-Defined Network Virtualization." Proceedings of the Asia-Pacific Advanced Network 40 (2015): 14-21. http://journals.sfu.ca/apan/index.php/apan/article/view/180_4.

Gouaich, Abdelkader, Fabien Michel and Yves Guiraud. "MIC*; a deployment environment for autonomous agents." Environments for Multi-Agent Systems. Springer Berlin Heidelberg, 2005. 109-126. http://www.lirmm.fr/~fmichel/publi/pdfs/gouaich05e4mas.pdf.

Sedlar, Urban et al. "Deploying and Managing a Network of Autonomous Internet Measurement Probes: Lessons Learned." International Journal of Distributed Sensor Networks 2015. (2015). http/downloads.hindawi.com/journals/jdsn/2015/852349.pdf.

Eric A. Hansen, et al. "Reinforcement Learning for Mixed Open-loop and Closed-loop Control", Department of Computer Science, University of Massachusetts, Amherst, MA.

Arne Bultman, et al. "Maintencance of KBS's by Domain Experts" "The Holy Grail in Practice", ASZ Research & Development, Kroenburg A-toren, Postbus 8300, 1005 CA Amsterdam, The Netherlands, (arne.bultman, joris.kuipers} @asz.nl; Dept. of AI, Faculty of Sciences, Vrije Universiteit Amsterdam, Frank.van.Harmelen@ca.vu.nl.

* cited by examiner

AGENT FOR LEARNING AND OPTIMIZATION EXECUTION

TECHNICAL FIELD

Embodiments of the present disclosure relate to dynamic systems in communications networks. Specifically, the disclosure relates to the automatic maintenance and updating of computer models in dynamic computer systems performing functions in communications networks.

BACKGROUND

Dynamic systems are currently being embraced by the network provider industry for cost savings and optimal resource usage at all levels. In a dynamic system, a domain expert is often required to train an initial model. It is impractical, however, for the domain expert to oversee the model's efficacy throughout its lifetime. Over time, increased error, sample drift, and model variance may cause the dynamic system to deteriorate in model fitness, uptime and performance.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EXEMPLARY EMBODIMENTS

Figure 1:
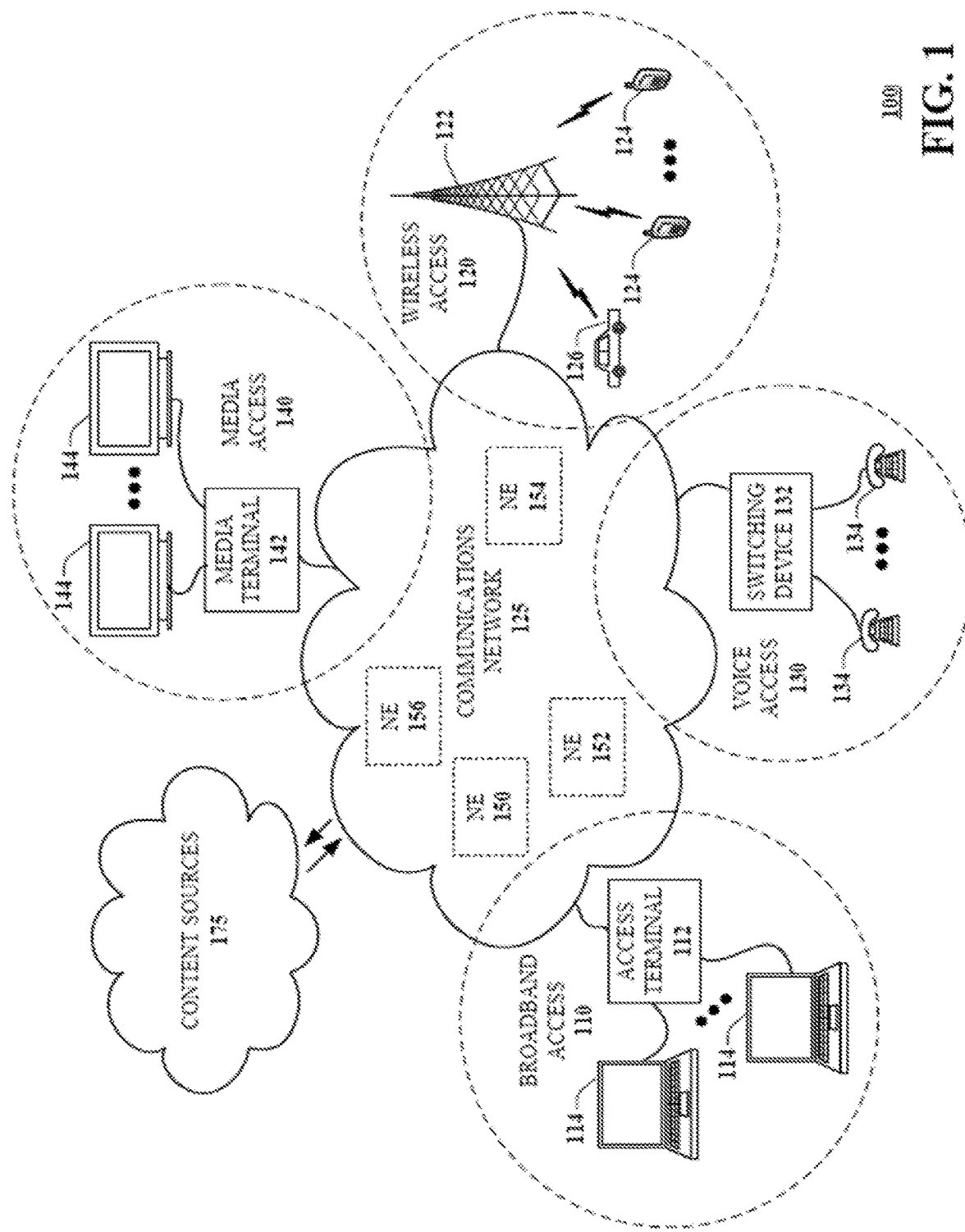
FIG. 1 is a block diagram showing a communications network in accordance with aspects of the present disclosure.

One requirement of dynamic computer systems is the ability to quickly learn and adapt to varying conditions, either at the request of a user (or customer) or at the request of the monitored system itself. The varying conditions might include, for example, changes in resource utilization, or changes in incoming system information. The semi-autonomous dynamic system software described herein is constructed to perform several functions. The system functions as a feedback or reinforcement system that remains one layer removed from user interaction, as a "model fitness" system. Additionally, the described system is an interactive system that maps user requirements, such as model fitness, uptime and performance, into underlying model parameters.

When a dynamic system is created, a domain expert is often required to train an initial model. The domain expert provides the expertise that forms the basis of the system, and uses that knowledge to construct the system and train the model. It is generally impractical, however, for the domain expert to oversee the model's efficacy throughout the lifetime of the model. The presently described system is an intelligent agent that is given a set of conditions (tolerated error, maximum sample drift, estimated model variance, etc.) that will cause subsequent retraining or adjustments of the model. The retraining or adjustment is automatic, without the involvement of the domain expert.

Regardless of the underlying model/algorithm used by the dynamic system, the presently described agent autonomously evaluates new samples and explores various options to keep the active model within tolerances specified by the model creator or domain expert. The actions taken by the autonomous agent can be selected from existing methods, such as domain adaptation, model retraining, partial model updates, sample/outlier removal, additional sample normalization, model parameter changes and post processing an output of the model.

Embodiments of the present disclosure include a method for maintaining a dynamic system comprising a machine learning model. Minimum acceptable criteria on the performance of the dynamic system are initially received. A comparison is made from current output samples of the dynamic system to the minimum acceptable criteria. The comparison is made independently of the machine learning model.

Based on the comparison, a plurality of alternative model improvement actions is formulated. Each of the model improvement actions is evaluated by modeling rewards using a reinforcement learning algorithm operating on previous outcomes resulting from implementing previous model improvement actions. The dynamic system is then altered to implement an optimal model improvement action having the greatest reward of the model improvement actions.

In other embodiments of the disclosure, an optimization agent system comprises one or more processors, a communications interface connecting the one or more processors with a dynamic computer system, a communications interface connecting the one or more processors with a secondary user, and at least one computer-readable storage device having stored thereon computer readable instructions for maintaining the dynamic system. Execution of the computer readable instructions by the one or more processors causes the processors to perform operations including: receiving, via the interface with the secondary user, minimum acceptable criteria on performance of the dynamic system; making a comparison of current output samples of the dynamic system to the minimum acceptable criteria, the comparison being made independently of the machine learning model; based on the comparison, formulating a plurality of alternative model improvement actions; evaluating each of the model improvement actions by modeling rewards associated with each model improvement action based on previous outcomes resulting from implementing previous model improvement actions; and altering the dynamic system to implement an optimal model improvement action having the greatest reward of the model improvement actions.

In further embodiments of the disclosure, a computer-readable storage device has stored thereon computer readable instructions for maintaining a dynamic system. Execution of the computer readable instructions by a processor causes the processor to perform operations comprising: updating a reinforcement learning algorithm using outcomes resulting from implementing previous model improvement actions on the dynamic system; receiving minimum acceptable criteria on performance of the dynamic system; making a comparison of current output samples of the dynamic system to the minimum acceptable criteria, the comparison being made independently of the machine learning model;

based on the comparison, formulating a plurality of alternative model improvement actions; evaluating each of the model improvement actions by modeling rewards associated with each model improvement action using the reinforcement learning algorithm; and altering the dynamic system to implement an optimal model improvement action having the greatest reward of the model improvement actions.

Reinforcement learning is a subtopic of machine learning wherein software agents take actions in an environment so as to maximize some notion of cumulative reward. The environment is a machine learning environment typically formulated as a Markov decision process (MDP). A major difference between the classical techniques and reinforcement learning is that reinforcement learning algorithms do not need knowledge about the MDP. Reinforcement learning algorithms may therefore target large MDPs where exact methods become infeasible. It should be noted that while the autonomous agent is described as a reinforcement learning algorithm, other machine learning methods could be utilized without departing from the scope of the invention.

The autonomous agent of the present disclosure may be implemented to maintain dynamic systems within a communications network environment. Such a communications network in accordance with various aspects described herein is illustrated by the block diagram 100 shown in FIG. 1. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text or other media. While broadband access 110, wireless access 120, voice access 130 and media access 140 are shown separately, one or more of these forms of access can be combined to provide multiple access services to a single client device.

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched telephone network, a voice over Internet protocol (VoIP) network, Internet protocol (IP) based television network, a cable network, a passive or active optical network, a 4G or higher wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G or higher modem, an optical modem and/or other access devices.

In various embodiments, the base station or access point 122 can include a 4G or higher base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2:
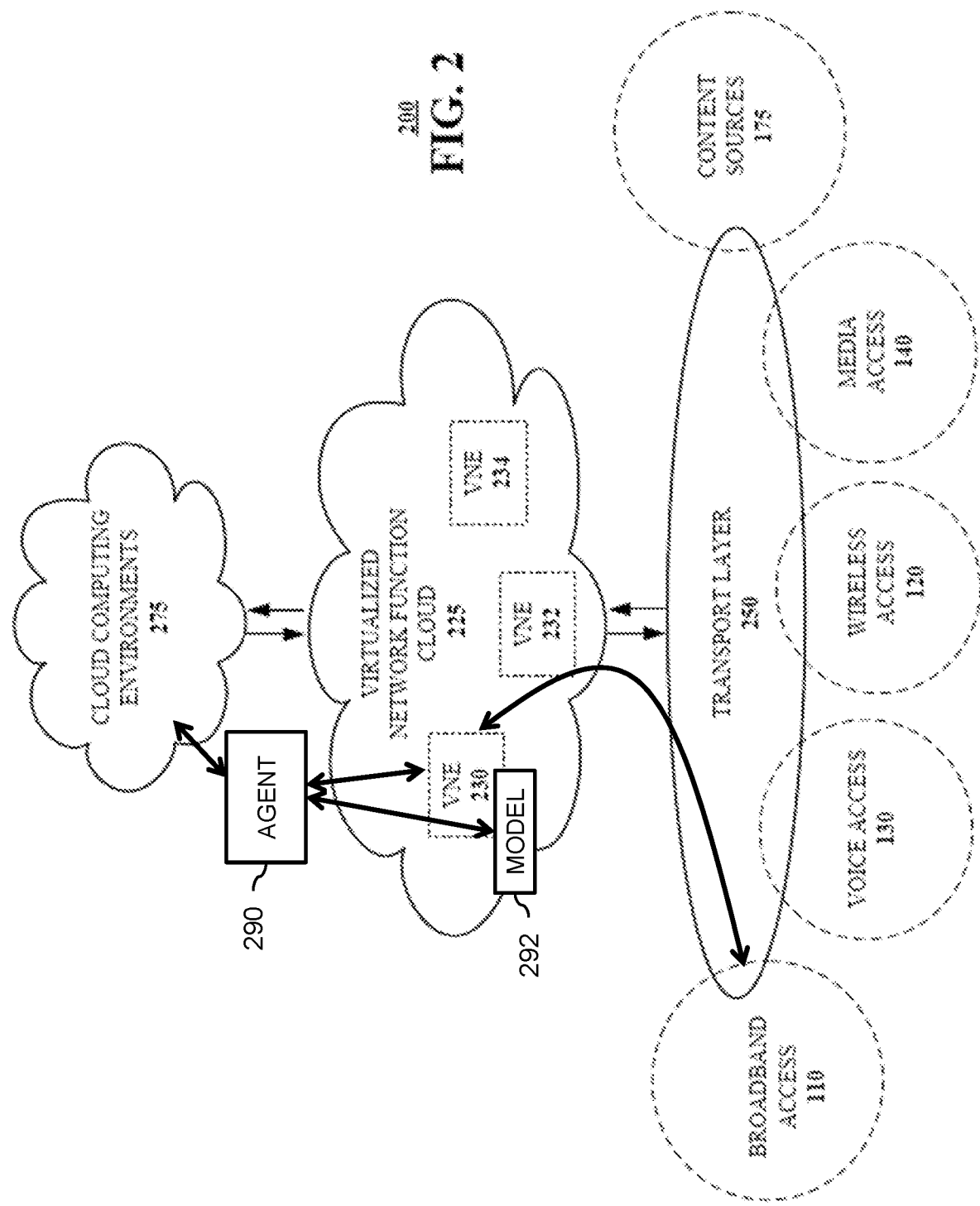
FIG. 2 is a block diagram showing a virtualized communications network in accordance with aspects of the present disclosure.

Referring now to FIG. 2, a block diagram 200 illustrating an example, non-limiting embodiment of a virtualized communication network in accordance with various aspects described herein, is shown. In particular a virtualized communication network is presented that can be used to implement some or all of the communications network 125 presented in conjunction with FIG. 1.

In particular, a cloud networking architecture is shown that leverages cloud technologies and supports rapid innovation and scalability via a transport layer 250, virtualized network function cloud 225 and/or one or more cloud computing environments 275. In various embodiments, this cloud networking architecture is an open architecture that leverages application programming interfaces (APIs), reduces complexity from services and operations; supports more nimble business models and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 230, 232, 234, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrate. The most typical type of substrate being servers that support Network Function Virtualization (NFV), followed by packet forwarding capabilities based on generic computing resources, with specialized network technologies brought to bear when general purpose processors or merchant silicon are not appropriate. In this case, communication services can be implemented as cloud-centric workloads.

As an example, a traditional network element 150, such as an edge router can be implemented via a virtual network element 230 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing that infrastructure easier to manage.

In an embodiment, the transport layer 250 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 230, 232 or 234. These network elements can be included in transport layer 250.

The virtualized network function cloud 225 interfaces with the transport layer 250 to provide the virtual network elements 230, 232, 234, etc. to provide specific NFVs. In particular, the virtualized network function cloud 225 leverages cloud operations, applications, and architectures to support networking workloads. The virtualized network elements 230, 232 and 234 can employ network function software that provides either a one-for-one mapping of traditional network element function or alternately some combination of network functions designed for cloud computing. For example, virtualized network elements 230, 232 and 234 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large aggregates of traffic, their workload can be distributed across a number of servers—each of which adds a portion of the capability, and overall which creates an elastic function with higher availability than its former monolithic version. These virtual network elements 230, 232, 234, etc. can be instantiated and managed using an orchestration approach similar to those used in cloud compute services.

The cloud computing environments 275 can interface with the virtualized network function cloud 225 via APIs that expose functional capabilities of the VNE 230, 232, 234, etc. to provide the flexible and expanded capabilities to the virtualized network function cloud 225. In particular, network workloads may have applications distributed across the virtualized network function cloud 225 and cloud computing environment 275 and in the commercial cloud, or might simply orchestrate workloads supported entirely in NFV infrastructure from these third party locations.

The virtual network element 230 may include a model 292 comprising one or more NFV software modules. For example, in the case where the virtual network element 230 implements an edge router, the model 292 may be used to provide improved broadband access services 110 by predicting and classifying network traffic. The model may be maintained by the presently described autonomous agent 290 without requiring continuing involvement of a domain expert. The autonomous agent 290 may collect information as described below from the cloud computing environments 275, including input by secondary users. The agent 290 may also receive data from the virtual network element 230 in the VNF cloud 225, and from the broadband access service 110.

Figure 3:
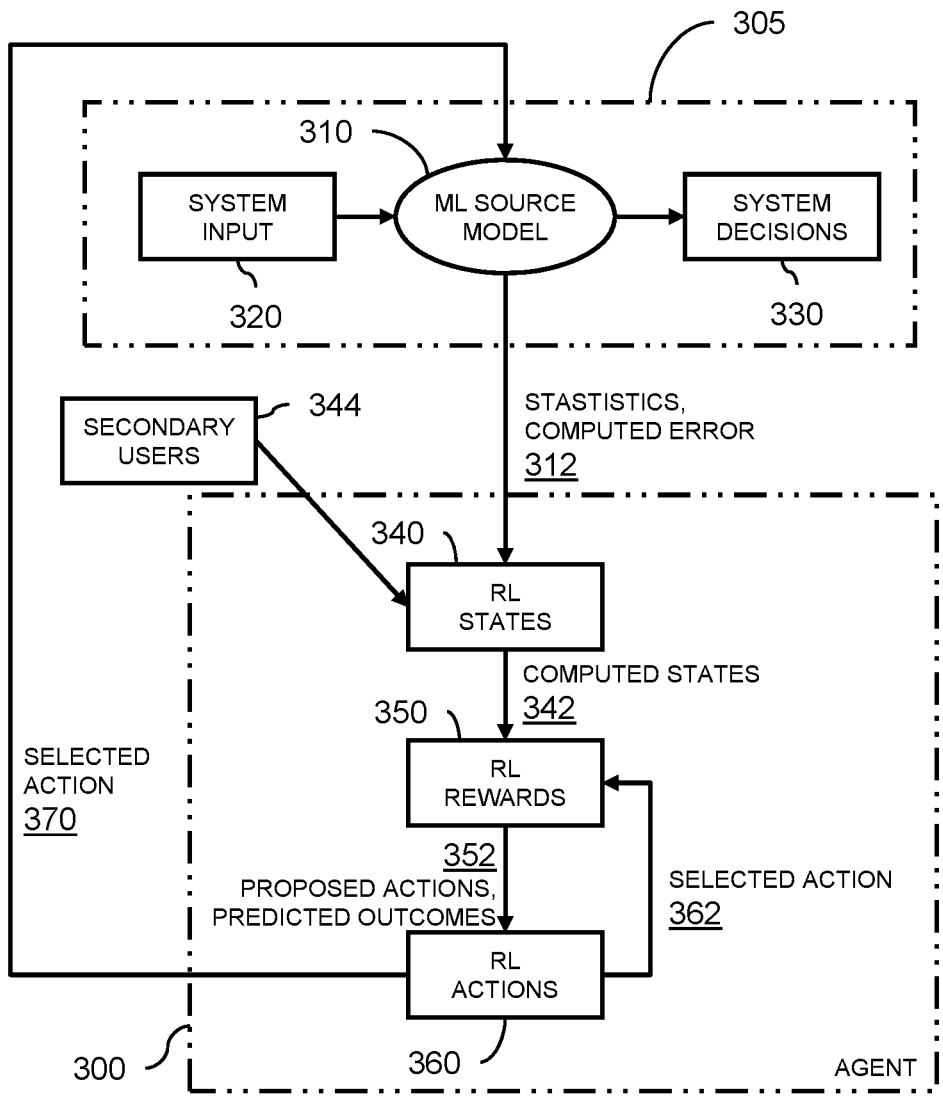
FIG. 3 is a block diagram showing a system in accordance with aspects of the present disclosure.

The described autonomous agent has three components utilizing reinforcement learning to evaluate and improve the secondary (black-box) machine learning source model. A shown in FIG. 3, those components of the autonomous agent 300 are a reinforced learning states component 340, a reinforced learning rewards component 350 and a reinforced learning actions component 360.

In an underlying system 305, a machine learning source model 310 models input 320 from the system and makes system decisions 330 such as routing decisions, reporting decisions, etc. The reinforcement learning states component 340 of the presently disclosed agent 300 receives computed error or general sample statistics 312 that may be provided by the machine learning source model 310. The agent 300 makes no assumptions about the specific source model 310 and instead operates exclusively on the received data 312. The reinforcement learning states component 340 receives acceptance criteria or rewards from one or more secondary users 344. Those criteria may include maximum difference between samples, maximum number of model errors, maximum or minimum resource usages or a maximum "age" of the model itself. The criteria are used by the states component 340 in computing one or more states 342 of the model.

Existing and developed data analysis methods are used by the reinforced learning rewards component 350 to track model fitness over time based on the computed states 342 and further based on notifications 362 of selected actions taken that are received from the reinforced learning actions component 360. The data analysis methods may include data whitening, sample exclusion, feature projection, and label refinement. As more data is added or alternate parameters are added, the rewards component 350 of the agent can propose (or fully evaluate) a number of actions 352 with different weights and expected outcomes with respect to the original model.

Those proposed actions 352 are evaluated automatically by the actions component 360 by collating and ranking the actions and predicted outcomes. An action 370 is selected for retraining, adapting or otherwise altering the initial black-box model 310. With full segregation of the agent 300 and the secondary black-box model system 305, any underlying machine learning mechanism could be utilized.

By providing a precise and methodical agent to constantly evaluate and update models as needed, the presently described system breaks the need for a domain expert to be resident for a well-specified model. The described agent does not need fully labeled data to operate and adapt existing models. Instead, the initial creator or secondary users design specific "rewards" and the system dynamically explores many possible solutions to achieve the highest reward.

The agent can be overlaid onto any existing model framework because it requires only the ability to (a) evaluate new samples and (b) retrain a model when necessary. The agent can be wholly autonomous and can thus react faster than human actions that may require (a) identification, (b) solution proposal, and (c) solution execution.

Figure 4:
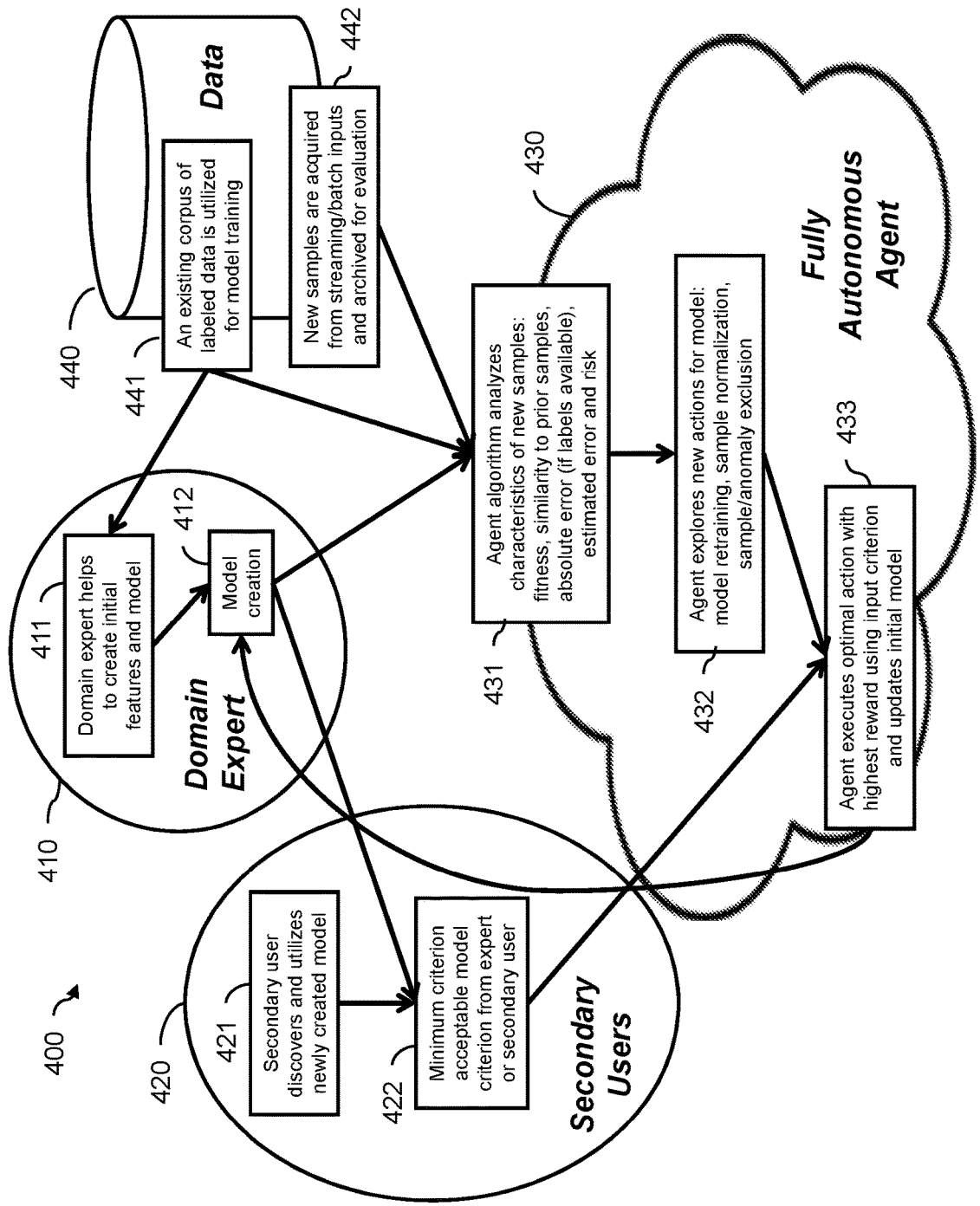
FIG. 4 is a block diagram showing tasks and information flow in accordance with aspects of the present disclosure.

Presently described is a unique application of unsupervised systems to continuously solve and optimize a secondary previously known problem or model. A block diagram 400 showing the interrelationship of tasks and information flow is shown in FIG. 4. The domain expert 410 initially defines the system and application at block 411 such that it can access samples (and labels) in a well understood format, can train a new model (with predetermine parameters), and can evaluate a new model. The domain expert 410 collects the relevant data and features to produce a new model at block 412. The created model is considered a black-box component by the system of the present disclosure and may be realized as any machine-learning model. Examples of the types of models that may be maintained using the presently disclosed agent include support vector machines (SVM), Gaussian mixture models (GMM), deep neural nets (DNN), and random forests (RF). The black-box model may be created by a specialist such as an operations expert, a researcher, a big data expert or a knowledge engineer. The specialist uses specific parameters tuned for the application. The model may be trained using an existing corpus of labeled data 441. All of the parameters and training requirements are codified such that they can be reused in an automated (e.g. command-line or XML) fashion.

Secondary users 420 decide to adopt the model at block 421. The secondary users provide some acceptance criteria or "rewards" at block 422. Examples of such rewards include a maximum difference between the samples, a maximum number of model errors, and a maximum "age" for the model itself. The agent archives the original training parameters and the criteria provided by secondary users.

The autonomous agent system 430 begins to evaluate new samples at block 431 as they are provided, evaluating statistical metrics and the model itself. The agent system 430 has access to data archives 440 that include new samples 442 that are acquired from active streaming/batch inputs and are archived. The new samples 442 are compared to older samples that have been archived, and are evaluated for drift and classification error. Occasionally, new labeled samples may be provided, but they are not a requirement.

As drift and/or classification error are detected, the agent system 430 begins to collate and rank at block 432 the possible actions that might be taken to alter the model and correct the drift or error. Some examples of such actions are: retraining the entire model, sub-sampling models, partial retraining of models and applying an adjustment function to the output scores. One skilled in the art will realize that this is only a subset of the actions that may be evaluated, and that other actions may be evaluated without departing from the scope or spirit of the disclosure. Each action may be evaluated or simulated (in terms of resource usage) to align to criteria specified by the secondary users 420.

The agent 430 chooses the action having the highest reward as specified by the expert creator 410 or the secondary users 420, and executes that action at block 433. These rewards offer a middle ground between the secondary users and the low-level model results, but the agent pairs reward magnitude to action to choose a final appropriate action.

An example application of the disclosed agent system will now be described with reference to a software defined network configuration for use by an Internet service provider (ISP). The example ISP application is described with reference to the block diagram 400 described above. In the example application, the ISP collects performance data, such as CPU, memory, bandwidth, timestamps, source, destination, content type, from network switches to provide a video service to a customer.

A domain expert first creates and trains a model (block 412) to predict when to distribute incoming data requests to different datacenters throughout the US. The black-box model (version A) happens to determine that the best time to distribute the video service to other datacenters on the West Coast is at 7 PM EST and the best time to distribute to centers on the East Coast is at 7 PM PST.

In the example case, the secondary user is the ISP customer, which utilizes the black box model at block 421. The customer implements its business logic by configuring its video service to always distribute a data center load when it reaches 80%. The model parameters and business logic are combined at block 422 and archived for this service.

During most periods of operation, the autonomous agent 430 determines at block 431 that the original model (version A) is sufficient to predict load. However, for special events (e.g. a Superbowl), the agent detects a sample deviation and a misclassification of when to distribute to datacenters.

The agent then explores new actions at block 432. In one example, the agent investigates three alternative actions: (1) retrain the prediction model (version B, which learns more importance for content type and source than timestamp), (2) slightly adapt the output of the prediction model, or (3) subsample the input data (by only including the last month of samples). Each alternative action is scored for accuracy and may also include a resource cost (computation/memory cost) for the action while low-level metrics are generated.

The agent then executes the optimal action having the highest reward at block 433. The agent couples the user requirement of 80% load with model accuracy, and picks model retraining to version B because it maximizes the reward.

The subject autonomous agent 430 may include a solicitation module that allows the agent to ask the domain expert 410 or the secondary user 420 for additional labels for specific data. For example, during the analysis 432 of sample characteristics, the agent 430 may determine that certain data would be more useful if labeled. The agent may request labels only if the value of the data, as measured by a reward associated with an action taken, would be enhanced by more than a threshold value.

The presently described agent has the ability to understand the parameters of the underlying model and to evaluate those parameters directly. For example, the agent may evaluate actions such as changing training parameters or features for model training. The agent is able to understand those parameters and training requirements because they were codified by the domain expert at the time the black-box model was created.

The agent may include a system to archive and remember historical models such that a "fallback" model could be directly used or coupled with any new models. The agent may incorporate new statistical methods for measuring sample fitness as they are developed. The method may be adapted for "big data" solution/systems instead of smaller scale analysis for model evaluation and training.

Figure 5:
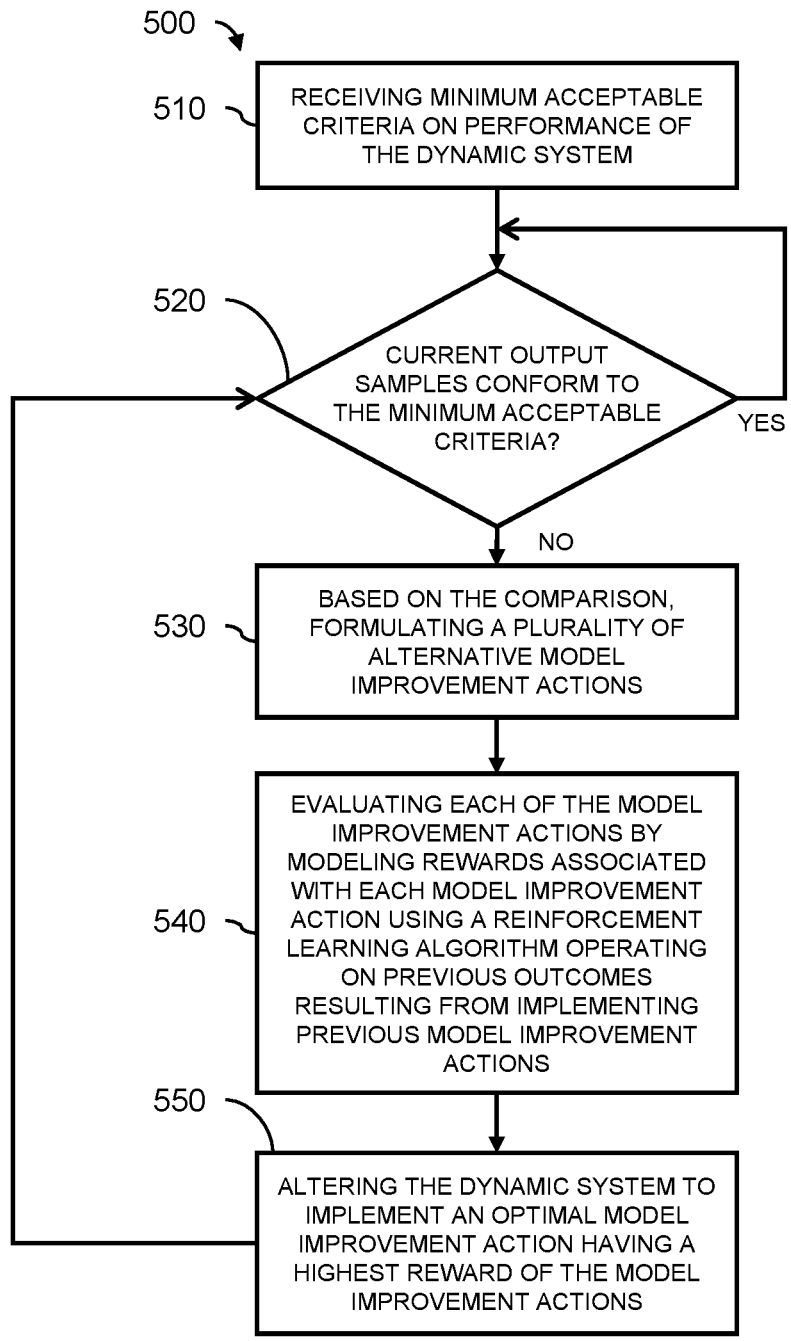
FIG. 5 is a block diagram showing a method in accordance with aspects of the present disclosure.

A method for maintaining a dynamic system, in accordance with embodiments of the disclosure, will now be discussed with reference to the block diagram 500 of FIG. 5. The method 500 operates on a dynamic system comprising an underlying machine learning model. The dynamic system may be a software defined network.

Minimum acceptable criteria on performance of the dynamic system are received at block 510 from secondary users of the dynamic system. The minimum acceptable criteria often comprise business logic or marketing rules. A secondary user may, for example, require that a certain subsystem never be overloaded, that a service lag never exceeds a certain time interval, or that a certain cloud server never falls below a certain percentage of excess capacity.

The agent then compares current output samples of the dynamic system to the minimum acceptable criteria at block 520. The comparison is made independently of the underlying machine learning model, and is instead made based on the output of the system. For that reason, the disclosed agent may be used with a variety of types of underlying models without requiring a detailed understanding of the model. The current output samples need not be labeled.

Based on the comparison, a plurality of alternative model improvement actions are formulated by the agent at block 530. The model improvement actions may include, for example, a retraining of the machine learning model, such as changing parameters used by the model. The alternative model improvement actions may include formulating a partial update of the model, or post processing an output of the model.

Each of the model improvement actions is then evaluated at block 540 by modeling rewards associated with each action. The evaluations are performed using a reinforcement learning algorithm operating on previous outcomes resulting from implementing previous model improvement actions. The rewards may be computed using the minimum acceptable criteria received from the secondary users, or may be computed independently of those criteria. In modeling the rewards, the amount of resources consumed by the actions may be considered. Further, the abandonment of a previously proven historical model may be considered.

The agent then alters the dynamic system at block 550 to implement an optimal model improvement action having a highest reward of the model improvement actions.

The hardware and the various network elements used in implementing the above-described agent comprise one or more processors, together with input/output capability and computer readable storage devices having computer readable instructions stored thereon that, when executed by the processors, cause the processors to perform various operations. The processors may be dedicated processors, or may be mainframe computers, desktop or laptop computers or any other device or group of devices capable of processing data. The processors are configured using software according to the present disclosure.

Each of the hardware elements also includes memory that functions as a data memory that stores data used during execution of programs in the processors, and is also used as a program work area. The memory may also function as a program memory for storing a program executed in the processors. The program may reside on any tangible, non-volatile computer-readable storage device as computer readable instructions stored thereon for execution by the processor to perform the operations.

Generally, the processors are configured with program modules that include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like, and may employ a distributed computing environment, where tasks are performed by remote processing devices that are linked through a communications network. In a distributed computing environment, modules may be located in both local and remote memory storage devices.

An exemplary processing module for implementing the methodology above may be stored in a separate memory that is read into a main memory of a processor or a plurality of processors from a computer readable storage device such as a ROM or other type of hard magnetic drive, optical storage, tape or flash memory. In the case of a program stored in a memory media, execution of sequences of instructions in the module causes the processor to perform the process operations described herein. The embodiments of the present disclosure are not limited to any specific combination of hardware and software.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude transitory signals such as propagated signals, which are not tangible and are not non-transitory. Cached information is considered to be stored on a computer-readable medium. Common expedients of computer-readable media are well-known in the art and need not be described in detail here.

The above-described agent provides a wholly autonomous ability to train, retrain, and evaluate an underlying model, without the involvement of a domain expert for the lifetime of the model. The technique provides support for a true "SDN" and Domain 2 ("D2") decision process for machine learning, where traditional rules about uptime and performance are not the only criteria for action selection. Rule-sets are replaced with full dynamic algorithm selection where inputs and decisions are not fully labeled: the samples do not have labels, and the rewards only loosely known.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. It is to be understood that various modifications will be implemented by those skilled in the art, without departing from the scope and spirit of the disclosure.

What is claimed is:

1. An optimization agent system comprising:
   one or more processors;
   a communications interface connecting the one or more processors with a computer system, the computer system operating based on a machine learning model of network traffic in a broadband access service provided by the computer system;
   a communications interface connecting the one or more processors with a secondary user;

at least one computer-readable storage device having stored thereon computer readable instructions for maintaining the computer system, wherein execution of the computer readable instructions by the one or more processors causes the processors to perform operations comprising:

receiving, via the communications interface with the secondary user, minimum acceptable criteria on performance of the computer system, the minimum acceptable criteria including a threshold data center load of the broadband access service, whereby a data center load is distributed when the threshold data center load is reached;

making a comparison of current output samples of the computer system to the minimum acceptable criteria, the comparison being made independently of the machine learning model wherein the current output samples are unlabeled;

based on the comparison, formulating a plurality of alternative model improvement actions for improving the machine learning model, the plurality of alternative model improvement actions including formulating a retraining of the machine learning model;

evaluating each of the plurality of alternative model improvement actions by modeling rewards associated with each of the plurality of alternative model improvement actions based on previous outcomes resulting from implementing previous model improvement actions;

selecting an optimal model improvement action as one of the plurality of alternative model improvement actions associated with a greatest one of the rewards; and altering the computer system to implement the optimal model improvement action; and when a value of data as measured by a reward with an action taken is enhanced by more than a threshold value, requesting labels for the data by an autonomous agent, wherein the data comprises the current output samples.

2. The optimization agent system of claim 1, wherein formulating the plurality of alternative model improvement actions includes post processing an output of the model.

3. The optimization agent system of claim 1, wherein modeling rewards associated with each alternative model improvement action further comprises computing the rewards using the minimum acceptable criteria.

4. The optimization agent system of claim 1, wherein the secondary user is an Internet service provider utilizing the broadband access service.

5. The optimization agent system of claim 1, wherein the alternative model improvement actions further include changing parameters used by the machine learning model and formulating a partial update of the machine learning model.

6. The optimization agent system of claim 1, wherein the optimization agent system is fully segregated from the machine learning model, the machine learning model being considered a black box by the optimization agent system.

7. A computer-readable medium having stored thereon computer readable instructions for maintaining a computer system operating based on a machine learning model of network traffic in a broadband access service provided by the computer system, wherein execution of the computer readable instructions by a processor causes the processor to perform operations comprising:

updating a reinforcement learning algorithm using outcomes resulting from implementing previous model improvement actions on the machine learning model;

receiving minimum acceptable criteria on performance of the computer system, the minimum acceptable criteria including a threshold data center load of the broadband access service, whereby a data center load is distributed when the threshold data center load is reached;

making a comparison of current output samples of the computer system to the minimum acceptable criteria, the comparison being made independently of the machine learning model;

based on the comparison, formulating a plurality of alternative model improvement actions for improving the machine learning model, the plurality of alternative model improvement actions including formulating a retraining of the machine learning model, changing parameters used by the machine learning model, and formulating a partial update of the machine learning model;

evaluating each of the plurality of alternative model improvement actions by modeling rewards associated with each of the plurality of alternative model improvement actions using the reinforcement learning algorithm;

selecting an optimal model improvement action as one of the plurality of alternative model improvement actions associated with a greatest one of the rewards; and altering the computer system to implement the optimal model improvement action; and when a value of data as measured by a reward with an action taken is enhanced by more than a threshold value, requesting labels for the data by an autonomous agent, wherein the data comprises the current output samples.

8. A method for maintaining a computer system, the computer system comprising a machine learning model of network traffic in a broadband access service provided by the computer system, the method comprising:

by an autonomous agent, receiving minimum acceptable criteria on performance of the computer system, the minimum acceptable criteria including a threshold data center load of the broadband access service, whereby a data center load is distributed when the threshold data center load is reached;

by the autonomous agent, making a comparison of current output samples of the computer system to the minimum acceptable criteria, the comparison being made by treating the machine learning model as a black box;

by the autonomous agent, based on the comparison, formulating a plurality of alternative model improvement actions for improving the machine learning model;

by the autonomous agent, evaluating each of the plurality of alternative model improvement actions by modeling rewards associated with each of the plurality of alternative model improvement actions using a reinforcement learning algorithm operating on previous outcomes resulting from implementing previous model improvement actions;

by the autonomous agent, selecting an optimal model improvement action as one of the plurality of alternative model improvement actions associated with a greatest one of the rewards;

altering the computer system to implement the optimal model improvement action; and when a value of data as measured by a reward with an action taken is enhanced by more than a threshold value, requesting labels for the data by an autonomous agent, wherein the data comprises the current output samples.

9. The method of claim 8, wherein formulating the plurality of alternative model improvement actions includes post processing an output of the model.

10. The method of claim 8, wherein modeling rewards associated with each model improvement action further comprises computing the rewards using the minimum acceptable criteria.

11. The method of claim 8, wherein modeling rewards associated with each alternative model improvement action is independent of the minimum acceptable criteria.

12. The method of claim 11, wherein modeling rewards associated with each alternative model improvement action considers an amount of resources consumed.

13. The method of claim 11, wherein modeling rewards associated with each alternative model improvement action considers abandoning a previously proven historical model.

14. The method of claim 8, wherein the secondary user is an Internet service provider utilizing the broadband access service.

* * * * *